(12) United States Patent
Kim et al.

(10) Patent No.: US 8,482,647 B2
(45) Date of Patent: *Jul. 9, 2013

(54) CMOS IMAGE SENSOR FOR HIGH SPEED SIGNAL PROCESSING

(75) Inventors: Nam-Ryeol Kim, Chungeheongbuk-do (KR); Song-Yl Kim, Chungcheongbuk-do (KR); Chang-Min Bae, Chungcheongbuk-do (KR); Hack-Soo Oh, Chungcheongbuk-do (KR)

(73) Assignee: Intellectual Ventures II LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/242,615

(22) Filed: Sep. 23, 2011

(65) Prior Publication Data

US 2012/0013774 A1    Jan. 19, 2012

Related U.S. Application Data

(63) Continuation of application No. 11/114,386, filed on Apr. 25, 2005, now Pat. No. 8,045,029.

(30) Foreign Application Priority Data

Apr. 26, 2004 (KR) .................................. 2004-28769

(51) Int. Cl.
  *H04N 5/217* (2006.01)
  *H04N 9/64* (2006.01)
  *H04N 3/14* (2006.01)
(52) U.S. Cl.
  USPC ............................ 348/308; 348/341; 348/245

(58) Field of Classification Search
  USPC .................................. 348/241, 245, 302, 308
  See application file for complete search history.

(56) References Cited

U.S. PATENT DOCUMENTS 4,525,741 A    6/1985 Chahal et al.
4,821,088 A    4/1989 Tabei et al.
(Continued)

FOREIGN PATENT DOCUMENTS

JP    H10285432    10/1998
JP    200032344    1/2000
(Continued)

OTHER PUBLICATIONS

Japanese Office Action for Japanese Patent Application No. 2005-128752, dated Jul. 9, 2010 (and English translation).

(Continued)

*Primary Examiner* — Timothy J Henn
(74) *Attorney, Agent, or Firm* — McAndrews, Held & Malloy, Ltd.

(57) ABSTRACT

A CMOS image sensor includes: a plurality of CDS/PGAs (correlating double sampling/programmable gain amplifiers) for processing output signals of pixels corresponding to same colors on different paths; and an offset difference removing part for removing offset difference that occurs when the same color signals are processed on the different paths, wherein the offset difference removing part includes: a dummy pixel array where light is shielded; a unit for reading signals of the dummy pixel array through the CDS/PGAs and storing average offset values for each path; and a signal synthesizing unit for synthesizing the average offset values and signals of an effective pixel array, which are read through the respective CDS/PGAs, and outputting signals of which offset difference is removed.

23 Claims, 6 Drawing Sheets

U.S. PATENT DOCUMENTS

| | | | |
|---|---|---|---|
| 6,236,434 B1 | 5/2001 | Yamada | |
| 6,466,265 B1 | 10/2002 | Lee et al. | |
| 6,538,695 B1 | 3/2003 | Xiao et al. | |
| 6,661,457 B1 | 12/2003 | Mathur et al. | |
| 6,801,255 B2 | 10/2004 | Inui | |
| 6,829,007 B1 * | 12/2004 | Bilhan et al. | 348/243 |
| 6,903,670 B1 | 6/2005 | Lee et al. | |
| 7,148,927 B2 | 12/2006 | Ogura et al. | |
| 7,489,357 B2 | 2/2009 | Nakada | |
| 8,045,029 B2 * | 10/2011 | Kim et al. | 348/308 |
| 2002/0140830 A1 | 10/2002 | Shirakawa et al. | |
| 2003/0234884 A1 | 12/2003 | Nakada | |
| 2005/0046719 A1 | 3/2005 | Inui | |

FOREIGN PATENT DOCUMENTS

| | | |
|---|---|---|
| JP | 2001245220 | 9/2001 |
| JP | 2004209713 | 7/2003 |
| JP | 2003259227 | 9/2003 |
| JP | 2004007471 | 1/2004 |
| JP | 2004015712 | 1/2004 |

OTHER PUBLICATIONS

English translation of Japanese Office Action for Japanese Patent Application No. 2005-128752, dated Mar. 29, 2011.

* cited by examiner

CMOS IMAGE SENSOR FOR HIGH SPEED SIGNAL PROCESSING

FIELD OF THE INVENTION

The present invention relates to a CMOS image sensor; and, more particularly, to a CMOS image sensor for high speed signal processing and a signal processing method therefor.

DESCRIPTION OF RELATED ART

An image sensor is an apparatus to convert an optical image into an electrical signal. Such an image sensor is largely classified into a complementary metal oxide semiconductor (CMOS) image sensor and a charge coupled device (CCD).

In the case of the CCD, individual MOS capacitors are disposed very close to one another and charge carriers are stored in the capacitors and transferred. Meanwhile, in the case of the CMOS image sensor, a pixel array is constructed using a technology of fabricating CMOS integrated circuit and output data are detected in sequence through a switching operation. Since the CMOS image sensor has an advantage of low power consumption, it is widely used in a personal communication system, such as a hand-held phone.

FIG. 1 is a block diagram of a conventional CMOS image sensor. In FIG. 1, a processing of image data signal obtained from pixels is shown.

FIG. 2 is a diagram of a pixel array arrangement of the conventional CMOS image sensor.

Referring to FIGS. 1 and 2, the conventional CMOS image sensor includes a pixel array 111 where red (R), green (G) and blue (B) pixels are arranged in an M_N matrix form (where M and N are positive integers). A correlated double sampling (CDS) part 12 including CDS circuits is provided at a lower side of the pixel array 110. The CDS circuit is provided at each column. An analog signal processor (ASP) part is provided at a right side of the pixel array 110 and processes the analog signals outputted from the CDS part 120. The ASP part is configured with a programmable gain amplifier (PGA) 130 and an analog-to-digital converter (ADC) 140.

Each CDS circuit of the CDS part 120 samples a reset signal and a data signal from a corresponding pixel. The PGA 130 calculates a difference between the reset signal and the data signal and amplifies it. The ADC 140 converts an analog signal inputted from the PGA 130 into a digital signal.

In reading a pixel data, the data of pixels arranged along one row of the pixel array 110 are transferred to the respective CDS circuits of the CDS part 120 at once and at the same time (at the same clock) by a row addressing. The outputs of the CDS circuits are sequentially applied on analog data buses by a column addressing and are transferred to the PGA 130.

As described above, according to the conventional CMOS image sensor, when one row is selected, the pixel signals (reset signal and data signal) of the selected row are stored in the corresponding CDS circuits. Then, the signals of the respective CDS circuits are sequentially transferred to the ASP by a column driver (not shown).

Meanwhile, as shown in FIG. 1, the analog signals obtained from the R, G and B pixel array pass through a single signal processing path and are converted into digital signals. Then, the imager processing is carried out using the digital signals.

However, when a large amount of data is processed through the single path, a processing speed of the corresponding path must be very fast. In addition, as an amount of data increases, the processing speed must increase much greater.

Further, in order for the high-speed operation, speed of the functional blocks (CDS, PGA, ADC) must increase. However, it is difficult to design the functional blocks to operate at high speed. Also, it is difficult to obtain signal stability. That is, if the functional blocks are designed to operate at high speed, a timing margin required for stabilizing signal values within a settling time becomes smaller. Consequently, reliability and productivity of the device may be badly affected.

SUMMARY OF THE INVENTION

It is, therefore, an object of the present invention to provide a CMOS image sensor, in which signal stability can be ensured using the low-speed functional blocks, while maintaining an entire signal processing speed. Further, it is possible to effectively remove the offset difference with respect to the same color signals, which may occur due to the multi-paths.

In accordance with an aspect of the present invention, there is provided a CMOS image sensor, including: a plurality of CDS/PGAs (correlating double sampling/programmable gain amplifiers) for processing output signals of pixels corresponding to same colors on different paths; and an offset difference removing part for removing offset difference that occurs when the same color signals are processed on the different paths, wherein the offset difference removing part includes: a dummy pixel array where light is shielded; a unit for reading signals of the dummy pixel array through the CDS/PGAs and storing average offset values for each path; and a signal synthesizing unit for synthesizing the average offset values and signals of an effective pixel array, which are read through the respective CDS/PGAs, and outputting signals of which offset difference is removed.

In accordance with another aspect of the present invention, there is provided a CMOS image sensor, including: a pixel array including R pixels, G pixels, B pixels, an effective pixel array and a dummy pixel array where light is shielded; a first analog signal processing path, disposed at one side of the pixel array, for processing analog signals outputted from the G pixels of the pixel array; and a second analog signal processing path, disposed at the other side of the pixel array, for processing analog signals outputted from the B pixels or the R pixels of the pixel array, wherein each of the first and second analog signal processing path includes: a plurality of CDS/PGAs for processing output signals of pixels corresponding to same colors on different paths; an ADC receiving output signals of the CDS/PGAs; a digital signal processor (DSP) for reading signals of the dummy pixel array through the CDS/PGAs and the ADC, and generating a digital average offset value for each path; a unit for converting the digital average offset value into an analog average offset value; and a signal synthesizing unit for synthesizing the analog average offset value and signals of the effective pixel array, which are read through the CDS/PGAs, and outputting the synthesized signal to the ADC.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Hereinafter, the present invention will be described in detail with reference to the accompanying drawings.

In accordance with the present invention, analog signals are processed through multi-paths so as to ensure a signal stability using low-speed functional blocks, while maintaining an entire signal processing speed. Also, offset values existing on respective paths are previously read through dummy pixels where light is shielded, and their average value is stored. When signals are outputted from effective pixels, the value is removed for each path. In this manner, the offset values that occur when the same color signals within the pixel array are processed through different paths can be effectively removed.

Figure 1:
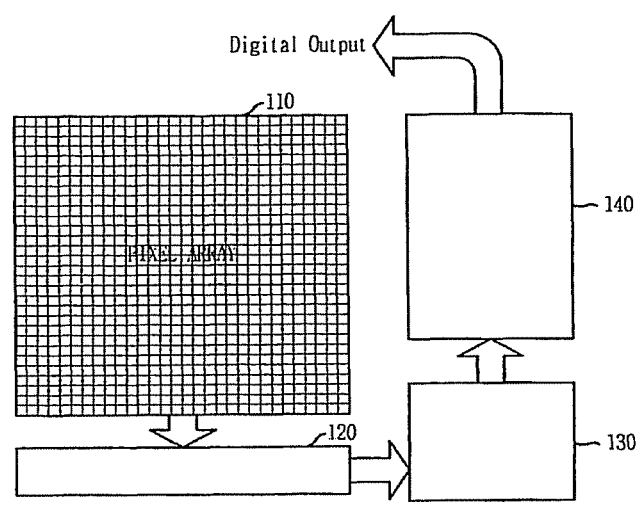
FIG. 1 is a diagram of a conventional CMOS image sensor, showing a signal processing path.
Figure 2:
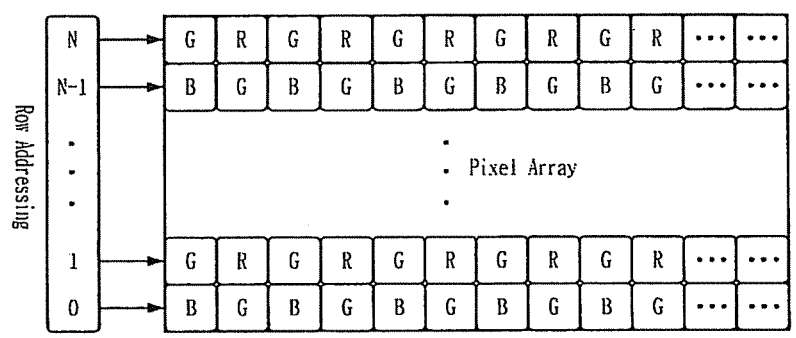
FIG. 2 is a diagram of a pixel array arrangement in a conventional CMOS image sensor.
Figure 3:
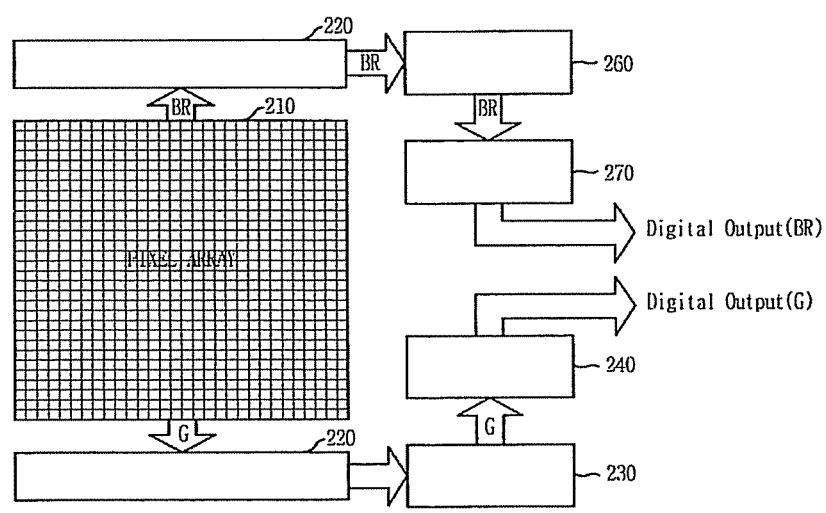
FIG. 3 is a block diagram of a CMOS image sensor in accordance with an embodiment of the present invention.

FIG. 3 is a block diagram of a CMOS image sensor in accordance with an embodiment of the present invention.

Figure 5:
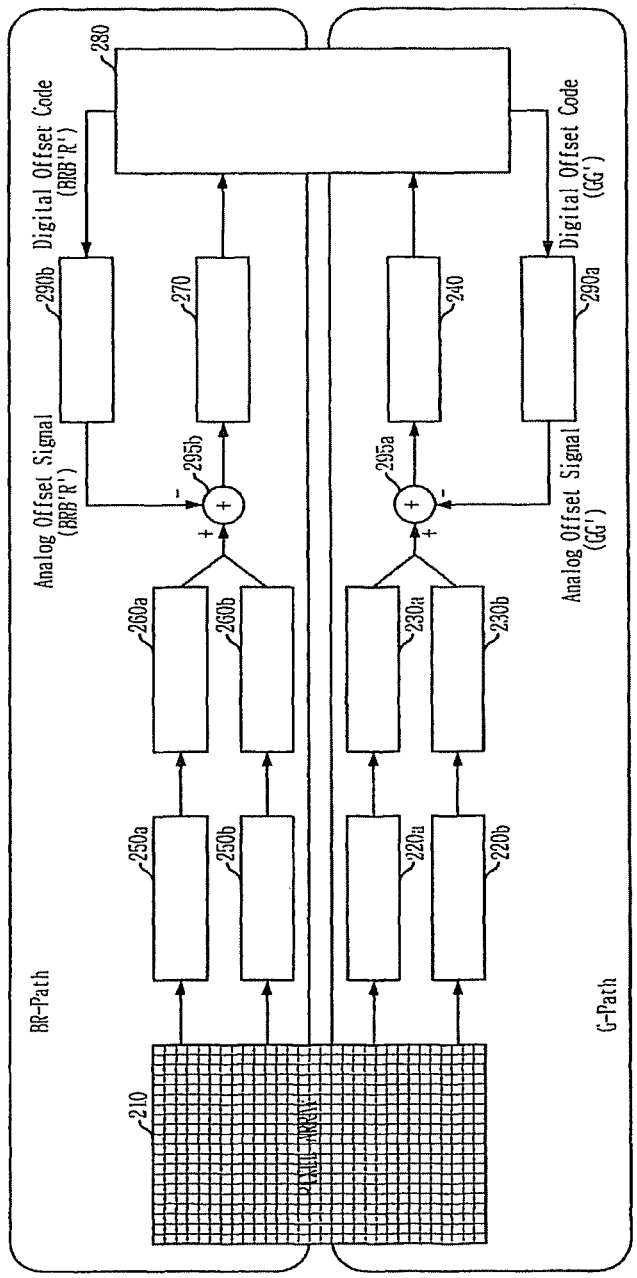
FIG. 5 is a block diagram of a CMOS image sensor in accordance with the present invention, showing a signal processing and an offset difference removal.

Referring to FIG. 3, analog signals outputted from pixels are parallel processed. That is, a G-path 220, 230 and 240 processes signals of G pixels, and a BR-path 250, 260 and 270 processes signals of B and G pixels. Also, as shown in FIG. 5, the G-path is divided into G-paths 220a, 230a and 240 and G'-path 220b, 230b and 240, and the BR-path is divided into BR-paths 250a, 260a and 270 and a B'R'-path 250b, 260b and 270. In the prior art, all R, G and B pixel signals are processed on a single path. On the contrary, in the present invention, the R, G and B pixel signals are separately processed on four paths of G, G', BR and B'R'. Accordingly, a processing speed at the corresponding path can be lowered by ¼ time, thereby solving the difficulty in circuit design and ensuring signal stability.

The image sensor in accordance with the present invention will be described below in more detail with reference to FIGS. 4 and 5. First, a structure of a pixel array will be described with reference to FIG. 4.

Figure 4:
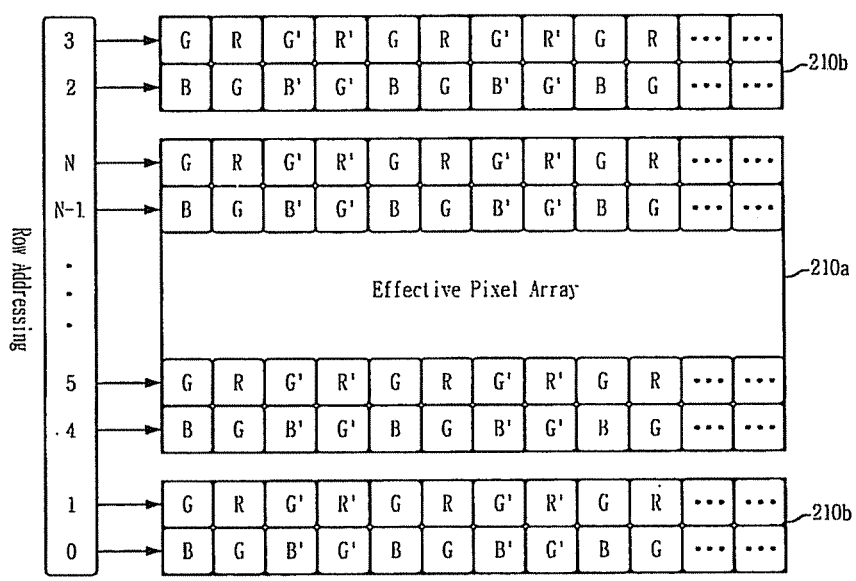
FIG. 4 is a diagram of a pixel array having a dummy pixel in a CMOS image sensor in accordance with an embodiment of the present invention.

FIG. 4 is a diagram of a pixel arrangement of a pixel array 210 having a dummy pixel array for measuring an offset value in a CMOS image sensor in accordance with the present invention.

The pixel array 210 includes three types of pixels, that is, R pixels, G pixels and B pixels. In general, the pixel array 210 includes even rows and odd rows. In the even row, a G pixel is arranged in a first column, and a G pixel and an R pixel are alternately arranged. In the odd row, a B pixel is arranged in a first column, and a B pixel and a G pixel are alternately arranged. Consequently, as shown in FIG. 4, the arrangement of the R, G and B pixels has R:G:B=1:2:1. Accordingly, as shown in FIG. 3, the pixel signals can be parallel processed on the divided paths, that is, the G-paths 220a, 230a and 240 and the BR-paths 220b, 230b and 240b.

Also, the pixel array 210 includes an effective pixel array 210a and a dummy pixel array 210b. The effective pixel array 210 is configured with R, G and B pixels arranged in an M×N matrix form (where M and N are positive integers). In the dummy pixel array 210b, light shielding material (for example, metal material) is disposed on light receiving elements, thereby preventing light incidence. The dummy pixel array 210b where an even row and an odd row are paired is disposed on upper and lower sides of the effective pixel array 210a.

If signals of the dummy pixel array 210b are read before reading pixel signals, intrinsic offset signals including offset signals existing in pixels and offset signals existing in CDS part, PGA and ADC can be obtained from each pixel.

Referring again to FIGS. 4 and 5, the pixel array 210 includes the R, G and B pixels, the effective pixel array 210a, and the dummy pixel array 210b with the light shielding.

The G-path is arranged at one side of the pixel array 210 and processes the analog signals outputted from the G pixels. The BR-path is arranged at the other side of the pixel array 210 and processes the analog signals outputted from the B pixels or the R pixels.

The G-path includes: a CDS(G) 220a and a PGA(G) 230a for processing output signals of G pixels; a CDS(G') 220b and a PGA(G') 230b for processing output signals of G' pixels; an ADC(GG') 240 for receiving signals from the CDS(G)/PGA(G) 220a and 230a and the CDS(G')/PGA(G') 220b and 230b; a digital signal processor (DSP) 280 for reading signals of the dummy pixel array through each path formed by the CDS/PGA/ADC and generating an average offset value for each path; an offset DAC(GG') 290a for converting a digital offset code corresponding to the average offset value into an analog offset signal corresponding to an analog average offset value; a signal synthesizer 295a for synthesizing signals of the effective pixel array, which are read through the CDS(G)/PGA(G) and CDS(G')/PGA(G'), and the analog offset signal and outputting the synthesized signal to the ADC(GG') 270a.

Similarly, the BR-path includes: a CDS(BR) 250a and a PGA(BR) 260a for processing output signals of BR pixels (exactly, B pixels or R pixels); a CDS(B'R') 250b and a PGA(B'R') 260b for processing output signals of B'R' pixels; an ADC(BRB'R') 270 for receiving signals from the CDS(BR)/PGA(BR) 250a and 260a and the CDS(B'R')/PGA(B'R') 250b and 260b; a digital signal processor (DSP) 280 for reading signals of the dummy pixel array through each path formed by the CDS/PGA/ADC and generating an average offset value for each path; an offset DAC(BRB'R') 290b for converting a digital offset code corresponding to the average offset value into an analog offset signal corresponding to an analog average offset value; a signal synthesizer 295b for synthesizing signals of the effective pixel array, which are read through the CDS(BR)/PGA(BR) and CDS(B'R')/PGA(B'R'), and the analog offset signal and outputting the synthesized signal to the ADC(BRB'R') 270.

While the pixel signals pass through the respective functional blocks (CDS, PGA, ADC), unintended additional signals as well as original signals the pixel signals may be added to the pixel signals. Such offset signals may have different values in each path. Accordingly, due to the addition of the offset values that are different according to the path difference, a fixed pattern noise (FPN) may occur in an output image of the pixel signals G-G', R-R' and B-B' having the different signal processing paths but the same property.

In order to solve this problem, the offset values existing on respective paths are previously read and their average value is stored. Then, when effective pixel signals are outputted, the value is removed in each path.

In more detail, the dummy pixel array is disposed at upper and lower sides of the pixel array. In the dummy pixel array, light shielding material (for example, metal material) is disposed on the light receiving elements of the respective pixels in the pixel array, thereby preventing light incidence. If signals of the dummy pixel array are read before reading pixel signals, intrinsic offset signals including offset signals existing in pixels and offset signals existing in the CDS, PGA and ADC can be outputted from each pixel.

Figure 6:
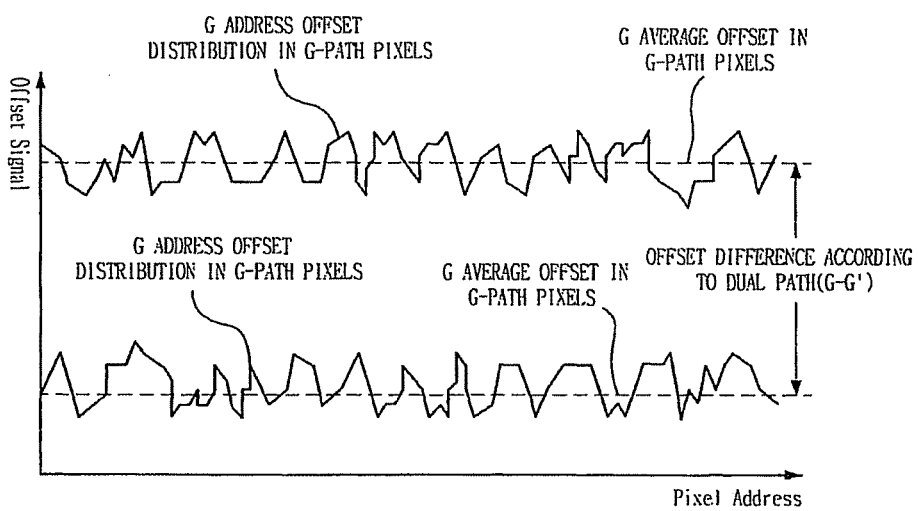
FIG. 6 is a graph illustrating an offset difference in multi-paths.
Figure 6:
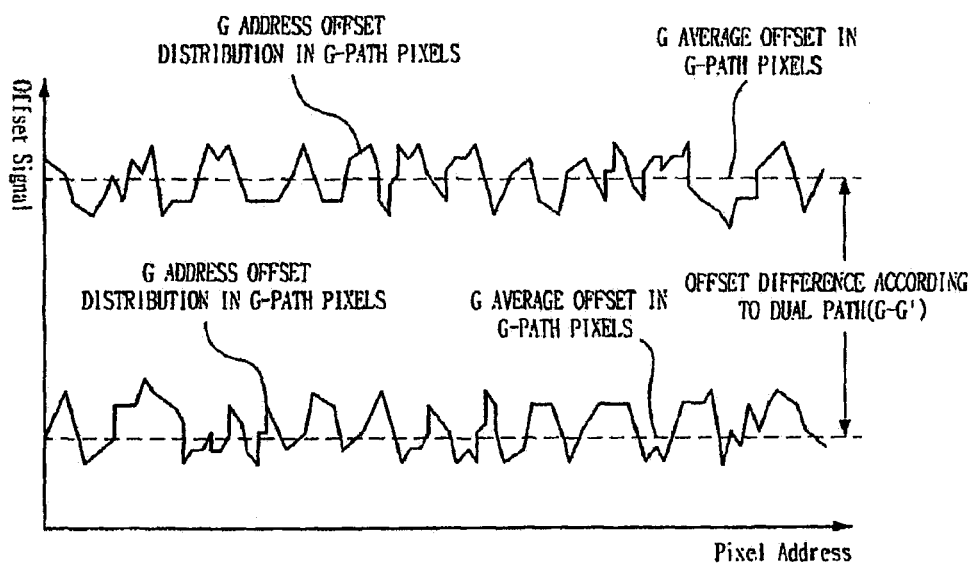

Referring to FIG. 6, in the G-path, G address offset signals are distributed and G' address offset signals are distributed. If calculating an average value of the respective pixel signals, an offset difference according to G-G' dual path difference appears. Such an offset difference causes the FPN on the output image. Accordingly, when the effective pixel signals are inputted, the average offset value that is previously read from the dummy pixel and stored is converted into the analog signal in the offset DACs 290a and 290b, and then subtracted. Consequently, an intrinsic signal whose offset is removed is outputted as a final output.

There are four paths and six signals G, G', B, B', R and R' are outputted through the paths. Therefore, six average offset values are required.

As a result, the high-speed signal processing can be achieved using the low-speed functional blocks and the offset difference caused due to the multi-paths can be effectively removed.

In order to improve the processing speed, the path can be extended to more than four paths. Also, although one ADC is arranged with respect to two paths (for example, G-G') in FIG. 5, one ADC having lower speed may be arranged in each path. If the ADC has a high speed, only one ADC may be arranged in an entire path.

For the dummy pixel array arranged in the upper and lower sides of the effective pixel array, its position and number may be changed for the purpose of calculating intrinsic average offset value.

Also, the light shielding material used for calculating the intrinsic offset value in the dummy pixel may be any material that can effectively shield the light.

In accordance with the present invention, the pixel signals are processed using the multi-paths having the parallel structure. Therefore, signal stability can be ensured using the low-speed functional blocks, while maintaining an entire signal processing speed. Further, it is possible to effectively remove the offset difference with respect to the same color signals, which may occur due to the multi-paths.

While the present invention has been described with respect to the particular embodiments, it will be apparent to those skilled in the art that various changes and modifications may be made without departing from the spirit and scope of the invention as defined in the following claims.

What is claimed is:

1. An image sensor comprising:
an effective pixel array including a plurality of color pixels arranged in a given color pattern;
a first analog signal processing path configured to concurrently process a first set of color pixels of the effective pixel array;
a second analog signal processing path configured to process a second set of color pixels of the effective pixel array, wherein the second set of color pixels of the effective pixel array and the second set of color pixels of the effective pixel array are comprised of pixels of mutually exclusive colors;
a digital signal processing system configured to receive signals from the first analog signal processing path to generate a first offset signal for the first analog signal processing path, and wherein the digital signal processing system is further configured to generate a second offset signal for the second analog signal processing path;
a first combiner circuit configured to combine an addressed pixel of the first set of color pixels of the effective pixel array, as received through the first analog signal processing path, with the first offset signal to thereby generate a first adjusted pixel signal at an output of the first combiner circuit;
a second combiner circuit configured to combine an addressed pixel of the second set of color pixels of the effective pixel array, as received through the second analog signal processing path, with the second offset signal to thereby generate a second adjusted pixel signal at an output of the first combiner circuit; and
a dummy pixel array including a plurality of color pixels that are shielded from light.

2. The image sensor of claim 1, wherein the first set of color pixels of the effective pixel array is comprised exclusively of green pixels.

3. The image sensor of claim 1, wherein the second set of color pixels of the effective pixel array is comprised exclusively of red and blue pixels.

4. The image sensor of claim 2, wherein the second set of color pixels is comprised exclusively of red and blue pixels.

5. The image sensor of claim 1, wherein the plurality of color pixels of the dummy pixel array includes a first set of color pixels corresponding to the first set of color pixels of the effective pixel array, wherein the plurality of color pixels of the dummy pixel array further includes a second set of color pixels corresponding to the second set of color pixels of the effective pixel array, and wherein at least a portion of the plurality of color pixels of the dummy pixel array are arranged in a same color pattern as the given color pattern of the effective pixel array.

6. The image sensor of claim 5, wherein the digital signal processing system is configured to generate the first offset signal from readouts of dummy pixels from the first set of color pixels of the dummy pixel array through the first analog signal processing path, and wherein the digital signal processing system is further configured to generate the second offset signal from readouts of dummy pixels from the second set of color pixels of the dummy pixel array through the second analog signal processing path.

7. The image sensor of claim 1, wherein the first offset signal is a first average offset corresponding to multiple readouts of the dummy pixel array as received through the first analog signal processing path, and wherein the second offset signal is a second average offset corresponding to multiple readouts of the dummy pixel array as received through the second analog signal processing path.

8. An image sensor comprising:
an effective pixel array including a plurality of color pixels arranged in a given color pattern;
a dummy pixel array including a plurality of color pixels that are shielded from light, wherein at least a portion of the plurality of color pixels of the dummy pixel array are arranged in the given color pattern;
an analog signal processing path configured to process pixel signals received from the plurality of color pixels of the effective pixel array and the plurality of color pixels of the dummy pixel array;
a digital signal processing system configured to receive analog signals from the analog signal processing path to generate an offset signal for the analog signal processing path, wherein the offset signal is determined using a dummy pixel signal obtained during a readout of the dummy pixel array as received through the analog signal processing path; and a combiner circuit configured to combine a pixel signal of an addressed pixel of the effective pixel array, as received through the analog signal processing path, with the offset signal to thereby generate an adjusted pixel signal at an output of the combiner circuit.

9. The image sensor of claim 8, wherein the analog signal processing path comprises a correlated double-sampling/programmable gain amplifier configured to process pixel signals of both the effective pixel array and the dummy pixel array.

10. The image sensor of claim 8, wherein the combiner circuit is further configured to provide a non-adjusted dummy pixel signal at its output when the effective pixel is in a non-addressed state.

11. The image sensor of claim 10, wherein the digital signal processing system comprises:
an analog-to-digital converter configured to convert an analog signal provided at the output of the combiner circuit into a corresponding digital signal;
a digital signal processor configured to receive the corresponding digital signal from the analog-to-digital converter, wherein the digital signal processor is further configured to use the non-adjusted dummy signal to generate a corresponding digital offset signal; and
a digital-to-analog converter configured to convert the digital offset signal to the offset signal that is provided to the combiner circuit.

12. The image sensor of claim 8, wherein the plurality of color pixels of the effective pixel array and the plurality of color pixels of the dummy pixel array are arranged in respective Bayer matrices.

13. The image sensor of claim 8, wherein the dummy pixel array is disposed at opposite sides of the effective pixel array in an overall pixel array.

14. The image sensor of claim 8, wherein the combiner circuit is an adder circuit.

15. The image sensor of claim 8, wherein the digital signal processing system provides an average offset signal corresponding to multiple readouts of the dummy pixel array as received through the analog signal processing path.

16. An image sensor comprising:
an effective pixel array including a plurality of blue, green, and red pixels arranged in a matrix pattern;
a dummy pixel array including a plurality of color pixels that are shielded from light, wherein at least a subsection of the dummy pixel array includes blue, green, and red pixels arranged in a same matrix pattern as the effective pixel array;
a first analog signal processing path configured to concurrently process at least two green pixel signals received from the effective pixel array, wherein the first analog signal processing path is further configured to process green pixel signals received from the dummy pixel array;
a second analog signal processing path configured to process blue pixel signals and red pixel signals received from the effective pixel array, wherein the second analog signal processing path is further configured to process blue pixel signals and red pixel signals received from the dummy pixel array;
a digital signal processing system configured to receive signals from the first and second analog signal processing path to generate a first offset signal for the first analog signal processing path, and a second offset signal for the second analog signal processing path, wherein the first offset signal is determined from readouts of dummy pixels through the first analog signal processing path, and wherein the second offset signal is determined from readouts of dummy pixels through the second analog signal processing path;
a first combiner circuit configured to combine concurrently processed green pixels of the first analog signal processing path with the first offset signal to thereby generate an adjusted green pixel signal; and
a second combiner circuit configured to combine concurrently processed output signals of the second analog signal processing path with the second offset signal to thereby generate adjusted red and blue pixel signals.

17. The image sensor of claim 16, wherein the first and second analog signal processing paths each comprise a correlated double-sampling/programmable gain amplifier configured to process pixel signals of both the effective pixel array and the dummy pixel array.

18. The image sensor of claim 16, wherein the digital signal processing system comprises:
a first analog-to-digital converter configured to convert signals provided from the first combiner circuit into corresponding first digital signals;
a second analog-to-digital converter configured to convert signals provided from the second combiner circuit into corresponding second digital signals;
a digital signal processor configured to receive the first and second digital signals to generate digital equivalents of the first and second offset signals; and
a first digital-to-analog converter configured to convert the digital equivalent of the first offset signal to the first offset signal; and
a second digital-to-analog converter configured to convert the digital equivalent of the second offset signal to the second offset signal.

19. The image sensor of claim 16, wherein the red, green, and blue pixels of both the effective pixel array and the dummy pixel array are arranged as Bayer matrices.

20. The image sensor of claim 16, wherein the first offset signal is a first average offset corresponding to multiple pixel readouts as received through the first analog signal processing path, and wherein the second offset signal is a second average offset signal corresponding to multiple pixel readouts as received through the second analog signal processing path.

21. An image sensor comprising:
an effective pixel array including a plurality of rows arranged in a color pattern of G, R, G', and R' pixels, and a further plurality of rows arranged in a color pattern of B, G, B', and G' pixels;
a first analog signal processing path configured to process G and G' pixels of the effective pixel array, wherein the first analog signal path includes a first analog signal sub-path configured to process the G pixels, and a second analog sub-path configured to process the G' pixels, wherein the first and second analog signal sub-paths are configured to concurrently process the G and G' pixels; and
a second analog signal processing path configured to process B, R, B', and R' color pixels of the effective pixel array, wherein the second analog signal processing path includes a third analog signal sub-path configured to process the B and R pixels, and a fourth analog signal sub-path configured to process the B' and R' pixels, wherein the third and fourth analog signal sub-paths are configured to process the B and R pixels concurrently with the B' and R' pixels.

22. The image sensor of claim 21, further comprising a digital signal processing system configured to receive signals from the first analog signal processing path to generate a first offset signal for the first analog signal processing path, and wherein the digital signal processing system is further configured to generate a second offset signal for the second analog signal processing path.

23. The image sensor of claim 22, wherein the first and second offset signals are generated using pixel signals received from a dummy pixel array having a color pattern corresponding to the effective pixel array.

* * * * *

UNITED STATES PATENT AND TRADEMARK OFFICE
CERTIFICATE OF CORRECTION

PATENT NO. : 8,482,647 B2
APPLICATION NO. : 13/242615
DATED : July 9, 2013
INVENTOR(S) : Kim et al.

It is certified that error appears in the above-identified patent and that said Letters Patent is hereby corrected as shown below:

On the title page, item (75), under "Inventors", in Column 1, Line 1,
delete "Chungeheongbuk-do" and insert -- Chungcheongbuk-do --, therefor.

On the title page, item (51), under "Int. Cl.", in Column 1, Line 1, delete "(2006.01)" and insert -- (2011.0) --, therefor.

In the Drawings

In Fig. 6, Sheet 6 of 6, delete " 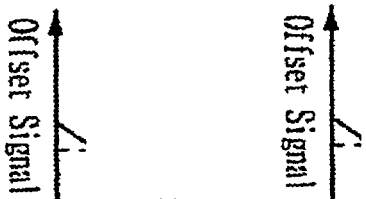 " and insert --     -- , therefor as shown on attached page.

Signed and Sealed this
Seventeenth Day of June, 2014

Michelle K. Lee
*Deputy Director of the United States Patent and Trademark Office*